United States Patent
King et al.

(10) Patent No.: US 11,146,047 B2
(45) Date of Patent: Oct. 12, 2021

(54) CABLE PULLING APPARATUS FOR CABLE TRAY

(71) Applicants: Charles A. Sheets, Bagdad, KY (US); Janet Stephens, Louisville, KY (US)

(72) Inventors: Daniel Scott King, Louisville, KY (US); Charles A Sheets, Bagdad, KY (US)

( * ) Notice: Subject to any disclaimer, the term of this patent is extended or adjusted under 35 U.S.C. 154(b) by 41 days.

(21) Appl. No.: 16/020,791

(22) Filed: Jun. 27, 2018

(65) Prior Publication Data

US 2019/0148923 A1     May 16, 2019

Related U.S. Application Data

(60) Provisional application No. 62/525,542, filed on Jun. 27, 2017.

(51) Int. Cl.
*H02G 1/08* (2006.01)
*H02G 3/04* (2006.01)

(52) U.S. Cl.
CPC ............. *H02G 1/081* (2013.01); *H02G 1/088* (2013.01); *H02G 3/0456* (2013.01)

(58) Field of Classification Search
CPC .......... H02G 1/088; H02G 1/081; H02G 1/08; H02G 1/00; H02G 1/06; H02G 3/04; H02G 3/0456; H02G 1/085; B61B 13/00; B61D 15/08
USPC ....... 254/134.3 R, 134.4, 134.5; 104/93, 119
See application file for complete search history.

(56) References Cited

U.S. PATENT DOCUMENTS

| | | | |
|---|---|---|---|
| 3,426,988 A | 2/1969 | Bradshaw et al. | |
| 3,602,467 A | 8/1971 | Thomas | |
| 3,637,175 A | 1/1972 | McElroy | |
| 3,770,233 A | 11/1973 | McElroy | |
| 4,221,365 A | 9/1980 | Brunskole | |
| 5,213,045 A * | 5/1993 | Gersemsky | B66C 11/06 104/93 |
| 5,779,229 A | 7/1998 | Lirette | |
| 6,109,561 A | 8/2000 | Haines | |
| 6,193,217 B1 | 2/2001 | Zimmer | |
| 6,729,606 B1 | 5/2004 | Dunn | |
| 7,130,521 B2 | 10/2006 | McCrary et al. | |
| 8,006,954 B2 | 8/2011 | Mallory | |
| 8,833,263 B2 * | 9/2014 | Fanshawe | B61B 13/02 104/118 |
| 9,988,060 B2 * | 6/2018 | Slurink | B61B 13/04 |
| 2002/0096671 A1 | 7/2002 | Johnson | |

(Continued)

*Primary Examiner* — Tryone V Hall, Jr.
*Assistant Examiner* — Joel D Crandall
(74) *Attorney, Agent, or Firm* — Carrithers Law Office, PLLC; David W. Carrithers

(57) ABSTRACT

A device for pulling a cable down the length of a cable tray including a trolley with rollers which rollingly grasp the upper side portion of the cable tray and allow the trolley to roll along the tray. The trolley includes a swivel cord grip which is releasably attached to one end of the cable, thus allowing the cable puller to pull the cable along the cable tray as the cable puller is propelled along the cable tray. The trolley can be pulled along manually by using one of two pull lines or 'jet lines' which are attached to the cable puller and lead to each end of the cable tray, or, more preferably, the trolley can be propelled up or down the cable tray by a remotely controlled motor which drives one or more of the rollers.

20 Claims, 10 Drawing Sheets

(56) References Cited

U.S. PATENT DOCUMENTS

| | | |
|---|---|---|
| 2004/0169170 A1 | 9/2004 | Hernandez |
| 2006/0151759 A1 | 7/2006 | Key et al. |
| 2007/0170408 A1 | 7/2007 | Martinez |
| 2011/0057157 A1 | 3/2011 | Holley |
| 2013/0105748 A1 | 5/2013 | Bukovac |
| 2014/0174315 A1* | 6/2014 | Camp .................... B61B 13/04 104/118 |

* cited by examiner

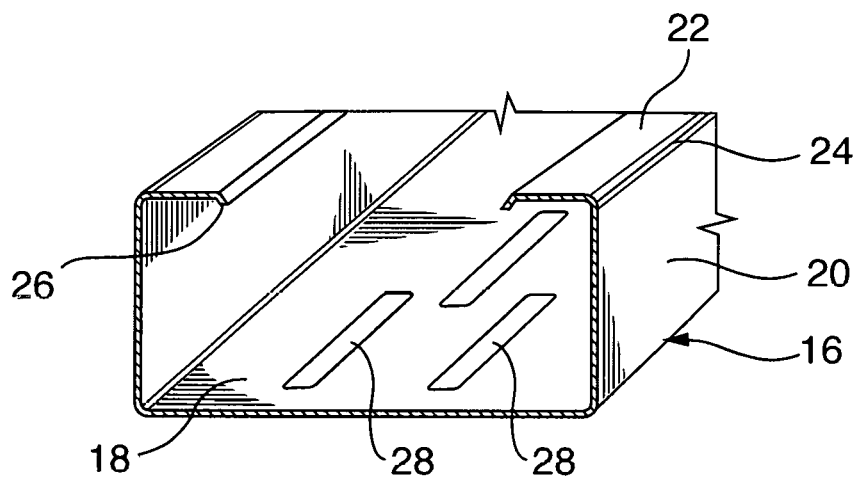
FIG. 3
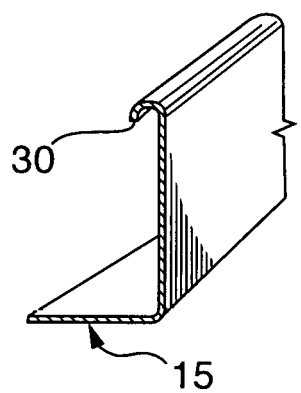
FIG. 4
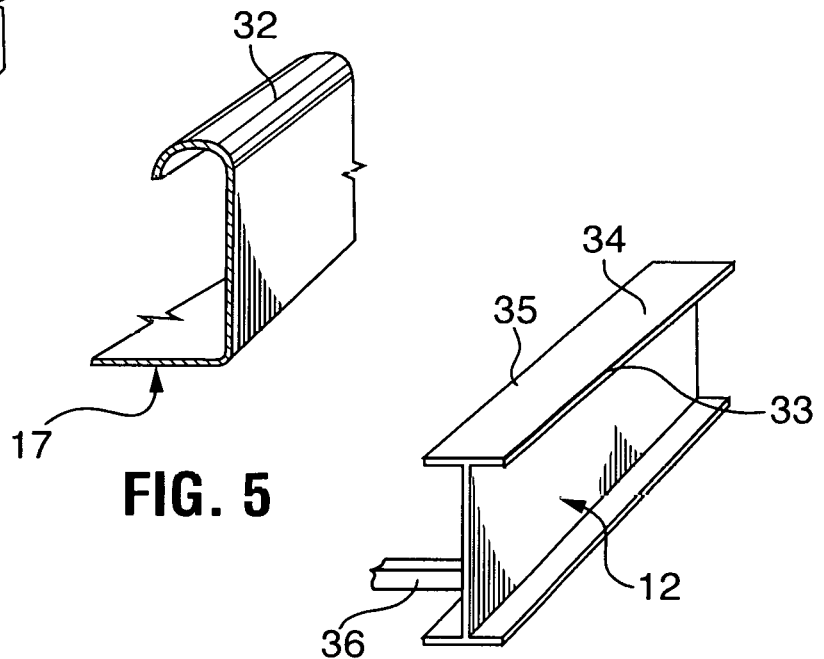
FIG. 5
FIG. 6

CABLE PULLING APPARATUS FOR CABLE TRAY

CROSS REFERENCES TO RELATED APPLICATIONS

This application claims priority from U.S. Provisional Application Ser. No. 62/525,542 filed on Jun. 27, 2017 which is incorporated by reference herein in its entirety.

TECHNICAL FIELD

The present invention relates to the field of devices used to pull rope or cable into a cable tray.

BACKGROUND OF THE INVENTION

When wiring buildings, a cable tray system can used to support insulated electric cables used for power distribution and communication. Cable trays are used as an alternative to open wiring or electrical conduit systems wherein galvanized pipping is installed first and then the wiring is pulled through the piping. Installation of such piping and wiring is hard, time consuming work and can make repair and troubleshooting very difficult. Cable trays are especially useful in situations where changes to a wiring system are anticipated, since new cables can be installed by laying them in the tray, instead of pulling them through a pipe.

Several types of cable trays are used in different applications. A solid-bottom tray provides the maximum protection to cables, but requires cutting the tray or using fittings to bring cables in or out of the tray. A deep, solid enclosure for cables is called a cable channel or cable trough.

A ventilated tray has openings in the bottom of the tray, allowing some air circulation around the cables, water drainage in case of water leaks, and allowing some dust to fall through the tray. Small cables can enter or exit the tray through the ventilation openings, which may be either slots or holes punched in the bottom. A ladder tray supports the cables with traverse bars, like the rungs of a ladder, at regular intervals on the order of 4 to 12 inches.

Some ladder trays and ventilated trays have solid covers to protect cables from falling objects, dust, and water. Tray covers for use outdoors or in dusty locations can have a peaked shape to shed debris including dust, ice or snow. Lighter cable trays are more appropriate in situations where a great number of small cables are used, such as for telephone or computer network cables. These trays may be made of wire mesh, called "cable basket" or may be designed in the form of a single central spine with ribs to support the cable on either side.

Large power cables laid in the tray may require support blocks to maintain spacing between conductors, to prevent overheating of the wires. Smaller cables may be laid unsecured in horizontal trays, or secured with cable ties to the bottom of vertically mounted trays.

All of the different cable tray configurations winding through walls, around equipment and air handling system and so forth, often times prove very difficult to install cabling due to the fact that the installers cannot stand over or near the cable try to help guide and install the cabling or to even install a pull string or rope which may then be used to pull heavier cables into the tray.

U.S. Pat. No. 5,779,229 by Gilles for CABLE TRAY ASSEMBLY INCLUDING A PULLING MECHANISM which issued on Jul. 14, 1998 teaches a tray system with a cable guided by pulleys causing the cable to traverse a path around a given area. Attachment means along the cable provide for moving particular elements along the path at given positions around the path.

SUMMARY OF THE INVENTION

The present device pulls one or more cables, lines, or tethers down the length of a cable tray including a trolley with rollers which cooperatively engage a flange or side lip or edge portion of the cable tray, conduit, or track and allow the trolley to roll along the tray. The trolley includes a swivel cord grip which is releasably attached to one end of the cable, thus allowing the cable puller to pull the cable along the cable tray as the cable puller is propelled along the cable tray. The trolley can be pulled along manually by using one of two pull lines or 'jet lines' which are attached to the cable puller and lead to each end of the cable tray, or, more preferably, the trolley can be propelled up or down the cable tray by a remotely controlled motor which drives one or more of the rollers.

In accordance with the present invention, there is provided a cable puller capable of pulling a cable inside and into a cable tray while the cable puller is propelled along the cable tray. The puller and tray assembly comprises, consists of, or consists essentially of a trolley body having a top side, a bottom side, a left side and a right side with the four sides forming a box which is open on a front side and a back side. The top side has at least one rectangular aperture formed therein and at least one top flat roller axially mounted to an inner edge of the rectangular aperture in the top side. At least one top roller has an axle which is perpendicular to a path passing through the front open side of the box. The top roller extends outward above and below the top side. The left side of the box includes a selected number of spaced apart arms having horizontal slots formed therein and extending outward from the left side. The top two slots each have first and second screws and wing nuts installed therein, a generally rectangular bracket having first and second vertical slots is adjustably connected to the top two arms by the first and second screws passing through the horizontal slots in the top two arms and then passing through the first and second vertical slots formed in the generally rectangular bracket. The generally rectangular bracket has at least one motor rigidly fastened thereto. The motor has an output shaft pointing toward a center of the box with a drive roller rigidly fastened thereto. The generally rectangular bracket is capable of being moved left and right, up and down for the purpose of moving the drive roller towards or away from the top roller. The right side of the trolley body is one solid square wall. The bottom side of the trolley body has two halves, a first half extending nearly half way toward a bottom edge of the left side from a lower edge of the right side. The first half of the bottom side includes a first pair of spaced apart rollers rotatably mounted on vertical axles journalled within recesses in the first half of the bottom side with the axles being equidistant from the right side of the box, and a second half of the bottom side of the box being slidably connected to bottom ones of the at least three spaced apart arms with at least one screw and wing nut combination. The second half of the bottom side includes a second pair of spaced apart rollers rotatably mounted on vertical axles journalled within recesses in the second half of the bottom side. The first pair of rollers are capable of rolling against the second pair of rollers and the second half of the bottom side is capable of being adjusted to receive an upper portion of one side of a cable tray and being adjusted to cause the first pair of rollers in order to press firmly against an inside surface of the one side of the cable tray while the second pair of rollers is pressing firmly against an outside surface of the one side of the cable tray supplying lateral support to the trolley body during movement along the cable tray. The motor is powered by a control unit which is in turn controlled by a remote control unit. The trolley body includes a pulling arm extending leftwards from the left side of the box. The pulling arm has a swivel cable grip fixedly fastened thereto.

More particularly, the cable puller is capable of pulling a cable into and down a cable tray as the cable puller is propelled along the cable tray, comprising a trolley body having a top side, a bottom side, a left side and a right side. The four sides form a box which is open on a front side and a back side, the top side having at least one rectangular aperture formed therein and at least one top flat roller axially mounted to an inner edge of the rectangular aperture in the top side. At least one top roller has an axle which is perpendicular to a path passing through the front open side of the box. The top roller extends outward above and below the top side, the left side of the box and includes spaced apart arms having slots formed therein and extending outward from the left side. The top slots each have means for fastening such as screws and wing nuts installed therein. A generally rectangular bracket has vertical slots adjustably connected to the top arms by the crews passing through the horizontal slots in the top arms and then passing through the vertical slots formed in the bracket.

The generally rectangular bracket has at least one motor rigidly fastened thereto having an output shaft pointing toward a center of the box and a drive roller rigidly fastened thereto. The generally rectangular bracket is capable of being moved left and right, up and down for the purpose of moving the drive roller towards or away from the top roller. The right side of the trolley body is defines a wall extending downward from a right side edge and a bottom side of the trolley body having two halves. A first half extending nearly half way toward a bottom edge of the left side from a lower edge of the right side, the first half of the bottom side including a first pair of spaced apart rollers rotatably mounted on vertical axles journalled within recesses in the first half of the bottom side with the axles being equidistant from the right side of the box. A second half of the bottom side of the box is slidably connected to bottom of the spaced apart arms with a fastener such as a screw and wing nut combination. The second half of the bottom side includes a second pair of spaced apart rollers rotatably mounted on vertical axles journalled within recesses in the second half of the bottom side. The first pair of rollers are capable of rolling against the second pair of rollers and the second half of the bottom side is capable of being adjusted to receive an upper portion of one side of a cable tray and re-adjusted to cause the first pair of rollers to press firmly against an inside surface of the one side of the cable tray while the second pair of rollers is pressed firmly against an outside surface of the one side of the cable tray supplying lateral support to the trolley body during movement along the cable tray. The motor is powered by a control unit which is in turn controlled by a remote control unit, the trolley body includes an pulling arm extending leftwards from the left side of the box. The pulling arm has a swivel cable grip fixedly fastened thereto in any one of several selected lateral positions thereon.

The present invention provides a cable puller that eliminates having to fish a pull string in over and over again to pull multiple cables into a cable tray. One of the many advantages of this tool is that it allows one to pull cables separately without twists and eliminates wasting cable. Once one cable is pulled in, the trolley can be pulled or driven back to attach another cable. This eliminates wasted time and enables one cable to be pulled while another pull string is being fished back in.

This cable puller comprises a rolling trolley that connects to the top of one side of the tray with guide rollers that clamp onto the top lip of the tray allowing the trolley to roll back and forth. The manual version of this device provides for connecting a pull string to both ends of the device enabling it to be pulled in both directions. The device has a swivel cord grip attached and hanging off inside the tray to allow a cable to be attached and detached quickly. Once a cable is attached, it can be placed in any section of the tray if dividers are present allowing the cable to be pulled in a designated section and in the pre-determined order in which they are to be pulled. Once the cable has been pulled in from one selected direction, the cable puller can be pulled back to the point of origin with the alternate pull string and will be ready to attach another cable immediately. The swivel cord grip prevents the cable from twisting around the pull string or other cables. This results in saving wasted cable and does away with wasted time used to get cables and pull strings untwisted.

The automatic version of the device is motorized, battery powered, and can be remotely controlled without requiring a pull string for moving the trolley.

Pulling cables in one at a time allows them to be organized in a linear ordered manner for wrapping and tying at each end preventing twisting of the cables providing easy identification, replacement, and/or repair in the future. The instant invention provides a cable pulling apparatus which solves all these problems.

This cable puller requires path on top of the tray with at least four inches of clearance on top and two inches of clearance on the side of tray.

There are many cases where a cable tray runs over an area where it is impossible for a man to reach and in some cases more tray must be run just to get more cable installed. In this situation, the automatic version which comes with a motorized roller and includes a remote control, provides a solution where an area can not be reached. The automatic version can either pull in a rope or string, also called a jet line, which can then be used to pull heavier cable, or the trolley can directly pull the cable into the tray.

This jet line and cable puller may be used as a manual pull by hand tool and can also be used with the upgraded version to have an electrical motor that runs automatically on the top lip of a cable tray. If the manual trolley is used, a jet line must be pulled in and connected to one end of the trolley and in one direction of the tray and another jet line must be connected to the other end of the tool and in the other direction of the cable tray. This requires a man on each end of the pull string. This allows the tool to be pulled back and forth in either direction so that the fishing of the pull string (jet line) is only required once in this section of the tray. Once in place, a cable can be connected and pulled in using the tool as a guide. When cable is pulled in from point A to point B, then the tool can be pulled back and ready for another cable to be attached.

When using the automatic version of this tool, the pull string (jet line) may be connected to the cable puller while the cable puller is remotely driven down the tray fishing the pull string (jet line) in the tray. This saves an incredible amount of time getting a pull string (jet line) fished into the tray. Installing a pull string (jet line) is the most time consuming part of pulling cable into a cable tray. This cable puller provides the answer to all the time and money lost in man hours, wherein men wait on a pull string to be pulled in the tray in order to pull the required cable into the tray.

The trolley includes a swivel cord grip hanging inside the tray to allow a cable to be attached and detached quickly. Once a cable is attached, the cable can be placed in any section of the tray if dividers are present, thus allowing the cable to be pulled in the section it is supposed to be in and in the right order in which it should be pulled. Once the cable has been pulled in from one direction then the trolley can be pulled back to the point of origin with the other pull string and will be ready to attach another cable, immediately. The swivel cord grip prevents the cable from twisting around the pull string or other cables.

Pulling cables in one at a time allows them to be straight and in order where they can be tie wrapped at each end. When all cables have been pulled in, there are no cables twisted around one another, thus allowing any cable to be replace with ease if needed in the future. This also allows for cables to be identified more quickly and easily. Cables are usually pulled in bulk to save man hours, but this always brings problems costing more time and bringing more problems, such as if one of the cables is too short, then all the cables must be pulled to get extra on that one cable. This causes a lot of wasted cable. Once the cables are twisted they will not pull separately.

There are different types of cable trays that are used to hold cables. The trolley is adjustable so as to fit the different types of tray. Every wheel and roller is made to adjust to the tray to insure that all the rollers are urged firmly against the cable tray surfaces. Thus, the rubber wheels/rollers grip the tray and enable the tool to run down the tray while an electrical motor drives at least one of the rubber wheels. This electrical motor is controlled by a hand held remote controller. This allows one to fish a jet line into the tray without having to be able to physically reach the tray by hand. Every adjustment has a quick adjustment lock similar to a wing nut so that adjustments can be performed easily and in a timely manner. The tool is also constructed out of aluminum and stainless steel to prevent rusting and to make it light weight. This tool installs jet lines quickly without having to go up and down in a lift physically reaching every part of the tray in order to get the jet line in the tray. With a swivel cord grip that hangs off in the tray, the jet line or cable can be pulled in any section of the tray that is required.

It is an object of this invention to provide a cable pulling device which includes rollers which rollingly support a trolley on the upper side of a cable tray along which the trolley is pulled by an attached pull string or jet line.

It is an object of the present invention to provide a cable puller which eliminates having to fish a pull string through a conduit over and over again.

It is an object of the present invention to pull cables along a conduit or frame member without twisting or wasting cable.

It is an object of the present invention to provide an optional swivel cord attachment may be used to provide a connection means for pulling a cable from either direction and allow the cable to twist without binding.

It is an object of the present invention to provide a connection means as an option in order to pull more than one cable at a time.

It is an object of this invention to provide a cable pulling device which includes a swivel cable grip which can removably hold a cable or jet line while the trolley is being pulled down the side of a cable tray.

It is an object of this invention to provide a cable pulling device which is fitted with a remote control motor which drives one of the rollers to automatically propel the trolley in either direction while pulling a cable or jet line through the cable tray.

It is an object of this invention to provide a cable pulling device including a trolley with rollers which rollingly support the trolley on the upper side of a cable tray and wherein the rollers can be adjusted so that the trolley is capable of being used on any of the many different profiles of cable tray in use today.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 3 is a perspective end view of a slotted cable tray having channel formed with a flat floor or base with spaced apart opposing side walls extending upward and inwardly forming an inwardly directed flange extending along the length of the longitudinal channel;

FIG. 4 is a corner end view of a cable tray defining a longitudinal member having a flat bottom and straight side wall extending upward therefrom with the upper edge turned inward and curved downward slightly;

FIG. 5 is a corner end view of a cable tray defining a longitudinal member having a flat bottom and straight side wall extending upward therefrom with the upper edge turned inward extending over the flat bottom or floor a selected length and curved downward forming a arcuate top portion;

FIG. 6 is an end view of a section of a cable tray defining an I-beam and having a connecting member or rung extending from a side wall of the I-beam outward for cooperative engagement with another I-beam or longitudinal member;

DETAILED DESCRIPTION OF THE PREFERRED EMBODIMENT

Figure 1:
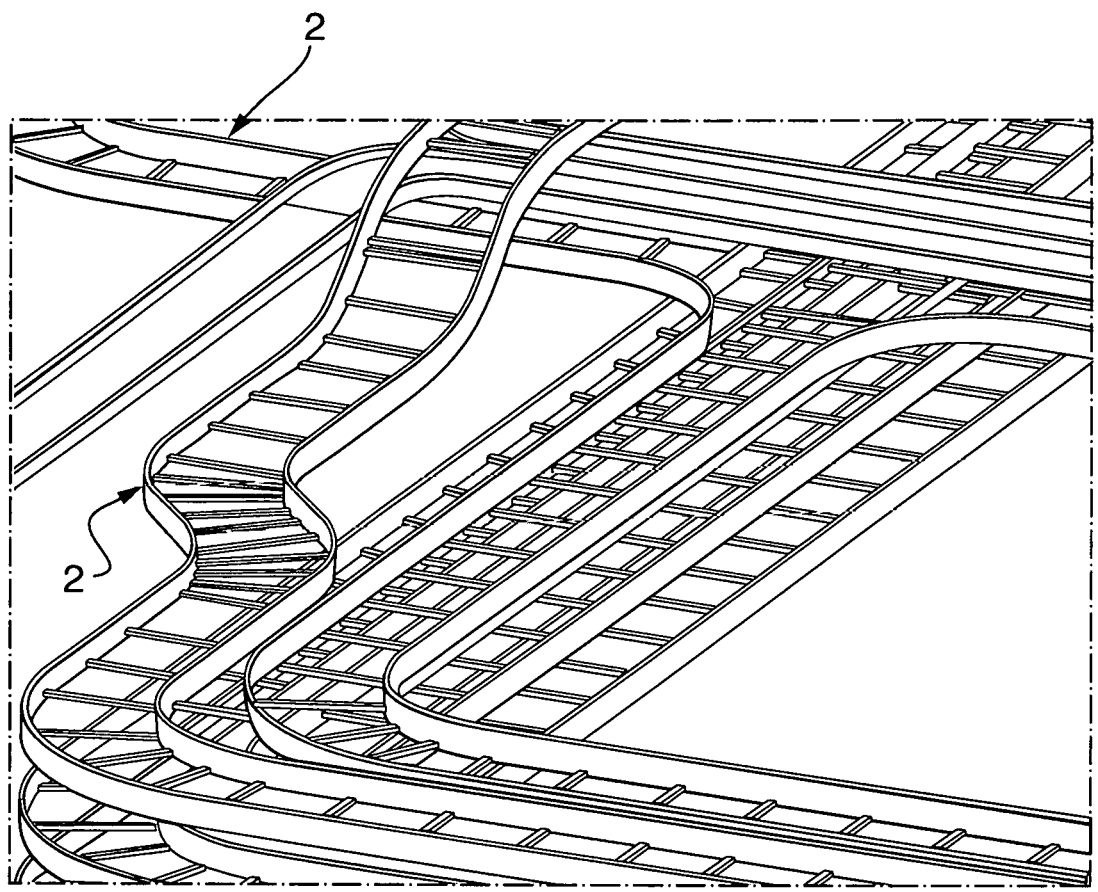
FIG. 1 is a perspective view of a portion of a cable tray layout showing different cable tray ladders, rails, and conduits used to support control wiring, communications wiring and power delivery wiring.
Figure 2:
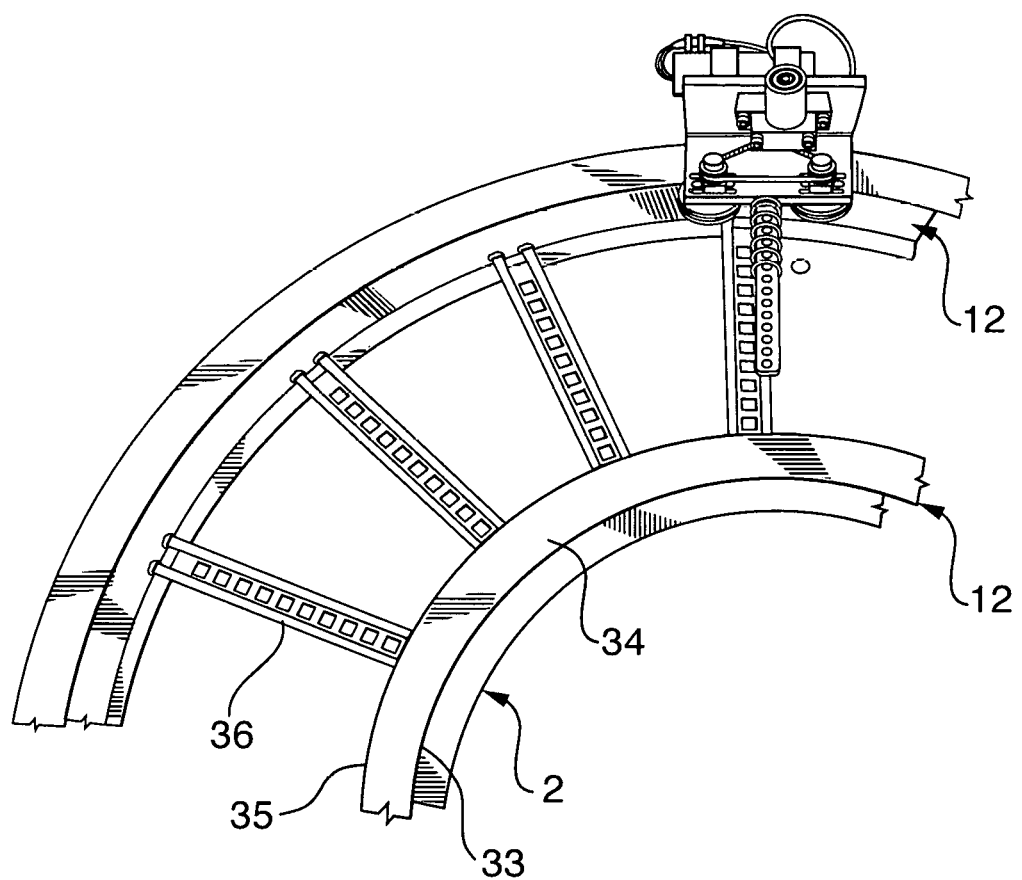
FIG. 2 is perspective view a perspective view of a ladder type cable tray showing a cable pulling unit mounted thereon and the cable tray conduit having a top and bottom leg connected by cross members wherein the trolley is mounted to a curved top leg portion.
Figure 7:
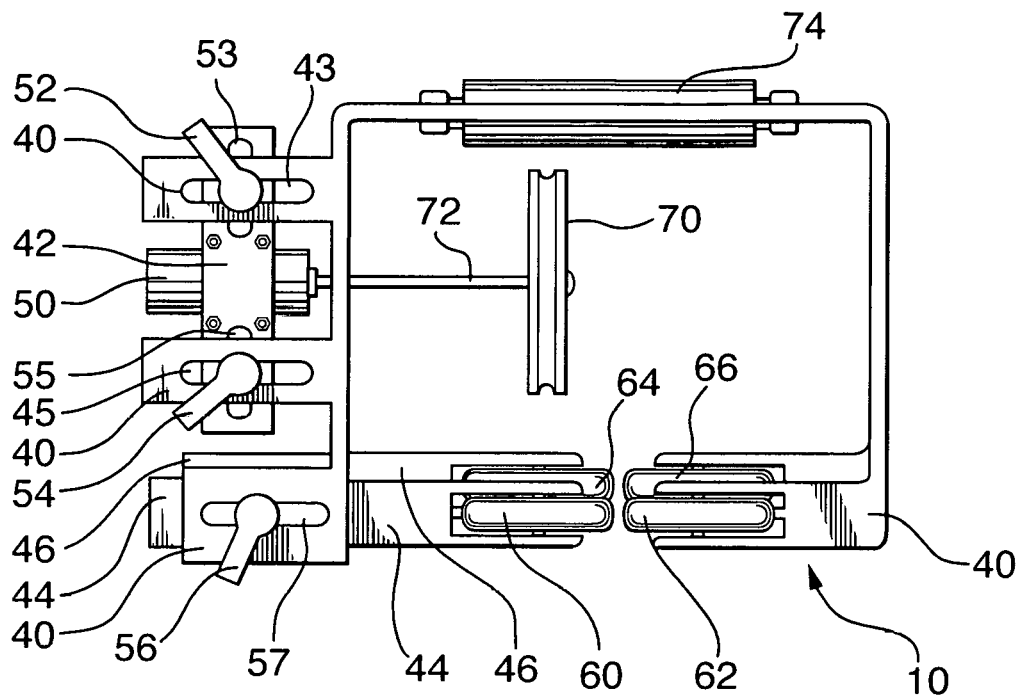
FIG. 7 is end view of the cable puller showing the trolley body, bracket, motor, drive rollers and retaining or guide roller.
Figure 8:
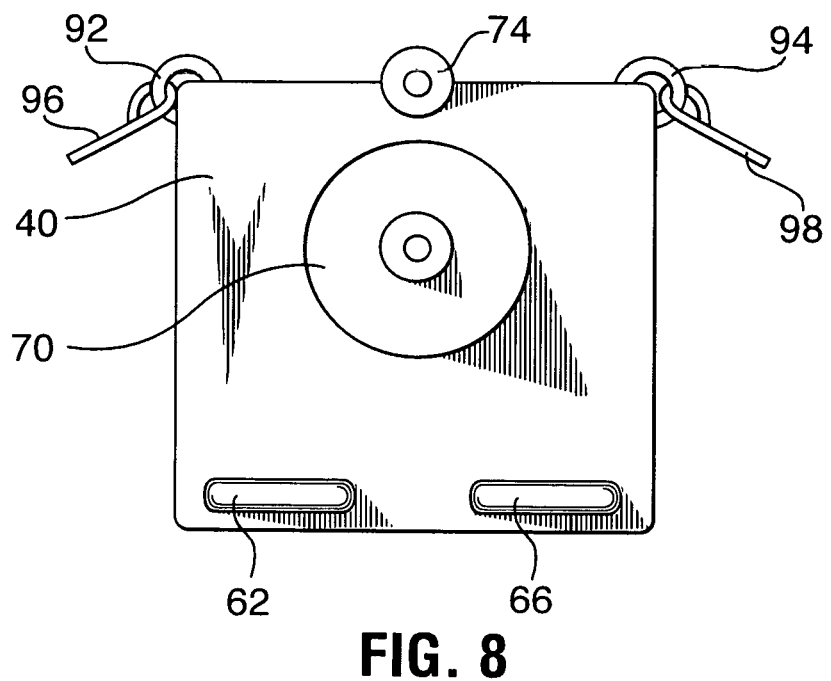
FIG. 8 shows a cable puller including and trolley body, rollers which allow the trolley body to roll down a selected side wall of a cable tray and be propelled by manually pulling a cord attached to attachment rings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in Figures, several types of cable tray assemblies including a ladder type cable tray, a vertical column I-beam cable tray, and a slotted conduit type cable tray. Different profiles of cable tray are shown in FIGS. 2-6. As shown in FIG. 3, the slotted tray includes a flat or arcuate upper lip 22 extending inwardly from the sidewall projecting upward from the base or floor of the tray. As shown in FIG. 5, the upper lip 32 of tray 17 is curved inwardly to extend over a portion of the floor of the tray. The trays all have sheet metal or plastic floors and some include with slotted apertures. In general, the upper lips of the trays are shaped to guide and protect the cables which are being installed. The tray 12 shown in FIG. 6 has sides made from spaced apart parallel I-beams joined by intermediate members or rungs 36 like a ladder.

A cable puller 10 includes a trolley body 40 and a plurality of rollers which allow the trolley body to roll down a selected side wall of a cable tray. The trolley can be propelled by pulling a cord 96 or 98 which may be attached to attachment rings 92 or 94 or an electric motor. Preferably, the trolley is propelled by a remote control motor which drives at least one of the rollers which support the trolley on the upper portion of the side of the cable tray. One or more cameras including a transmitter and in electrical communication with a smart computerized device such as a phone, tablet, PC, or other video device may be affixed to the trolley body frame and the cameras and/or motor can be controlled with the smart device. The motor driven roller preferably has a friction enhancing means such as rubber or elastomeric surface or coating which is held tightly against a surface of the cable tray, providing traction so that the trolley is propelled along the edge of the cable tray.

As shown in figures, the trolley is supported on the upper portion of the top side of the cable tray by holding means such as one or more rollers 74. The holding means supports the weight of the trolley and tether attached thereto. The trolley may include at least one and preferably two or more spaced apart parallel upper support rollers 74. To maintain the lateral support (for preventing lateral or side to side movement) the rollers may include central groove which travels on the raised portion of the track or a pair of adjacent rollers 60, 62 and 64, 66 providing a center groove there between. The rollers 62 and 66 have axles that are journalled in the recesses of the right half of the bottom side of the trolley body 40. The right half of the bottom side of the trolley body extends from the bottom of the right side of the trolley body toward the bottom of the left side of the trolley body. The other two rollers 60 and 64 are individually supported independent of the trolley body on slidably adjustable brackets 44 and 46, respectively, which form the left half of the bottom side of the trolley body. These brackets may be adjusted to urge the rollers against one side of the cable tray, thus forcing that side of the cable tray against the other two rollers 64 and 66. In this way, the side of the cable tray is pinched by the four rollers, thus giving lateral support to the trolley 10. The slidably adjustable brackets 44 and 46 can be moved by loosening the wing nuts 56 and 58 and sliding the brackets in the slots 57 and 59 of the arms extending from the left side of the trolley body. Wing nut 58 and slot 59 are not visible in the Figures. One or more drive rollers 70 is driven by the motor 50. The motor 50 is fixedly connected to a bracket 42. The bracket 42 is adjustably connected to the trolley body 40.

Means for fastening such as bolts and nuts, or screws and wing nuts 52 and 54 hold the bracket 42 to the trolley body 40. The motor bracket 42 has vertical slots 53 and 55, and the trolley body 42 has horizontal slots 43 and 45, so that the motor can be adjusted up and down and left and right when the wing nuts 52 and 54 are loosened. In this way, the drive roller 70 can be placed in a variety of places along the width of the upper lip 22 of the cable tray 16 and can then be urged tightly against the lower side of the lip 22 of the cable tray, and then fixed in place by tightening the wing nuts 52 and 54. Another embodiment of the present invention includes a second drive roller 70 and a second top roller for improving the pulling power of the trolley.

The battery pack with remote control circuitry 90 fixedly connected to the trolley body 40 and electrically connected to the motor 50 by cables 51. The trolley body has an arm 80 extending inward over the cable tray. The arm has a plurality of holes 88 for attaching the swivel cable grip 84 in a variety of lateral positions, so that the cable may be placed in a selected lateral position in the tray.

The trolley can be preprogrammed or a remote controller can be used to move the cable puller forward and back and forth. Means for determining distance such as a wheel revolution counter or GPS can be utilized to determine where the trolley is in the conduit at any particular time.

Cable trays are often provided with dividers which help to keep different cables separate from one another. One type of divider which includes vertical pegs which keep cables 96 separate form other cables. Other dividers include parallel vertical walls which run down selected lengths of cable tray sections.

Preferred embodiment including a tension spring member to hold the to the track and allow for small variances in the tolerance of the track or rail at attachment points, curved rail sections, a belt drive means for driving all of the pulleys, and the motor mounted to the trolley body.

Figure 9:
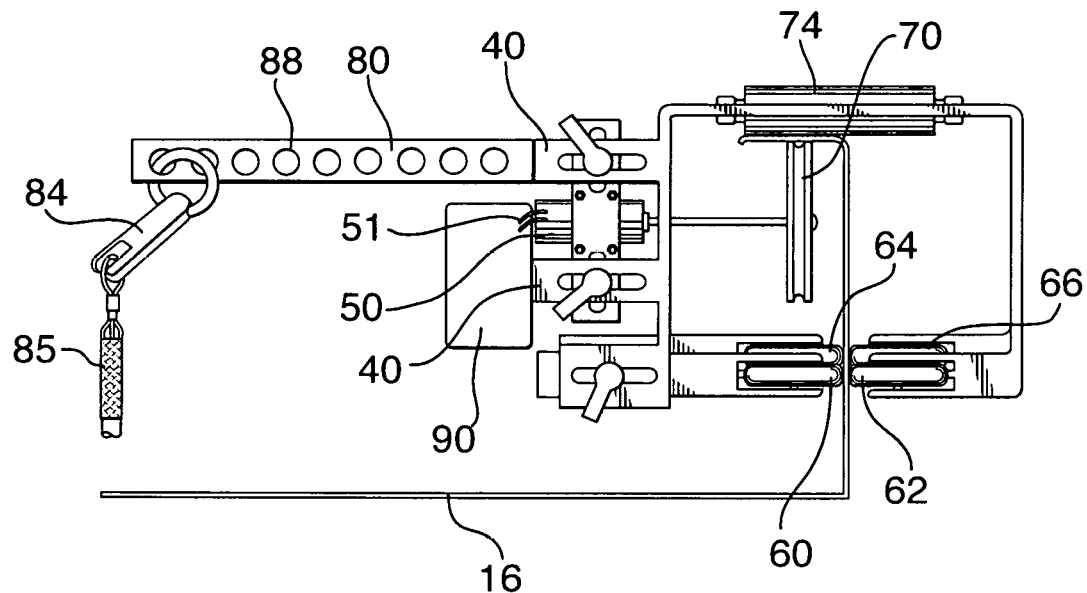
FIG. 9 is an end view of the cable puller operationally mounted on the sidewall and flange of the cable tray.
Figure 10:
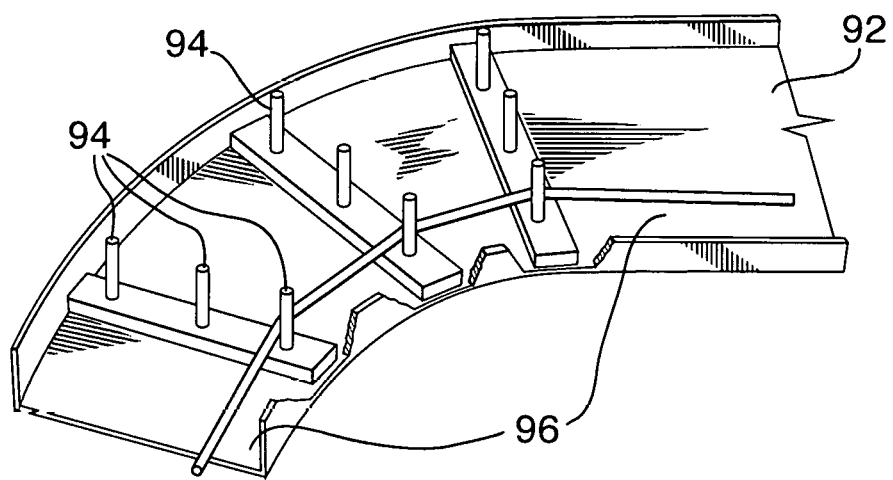
FIG. 10 is a perspective view of a cable tray corner with divider pegs.
Figure 11:
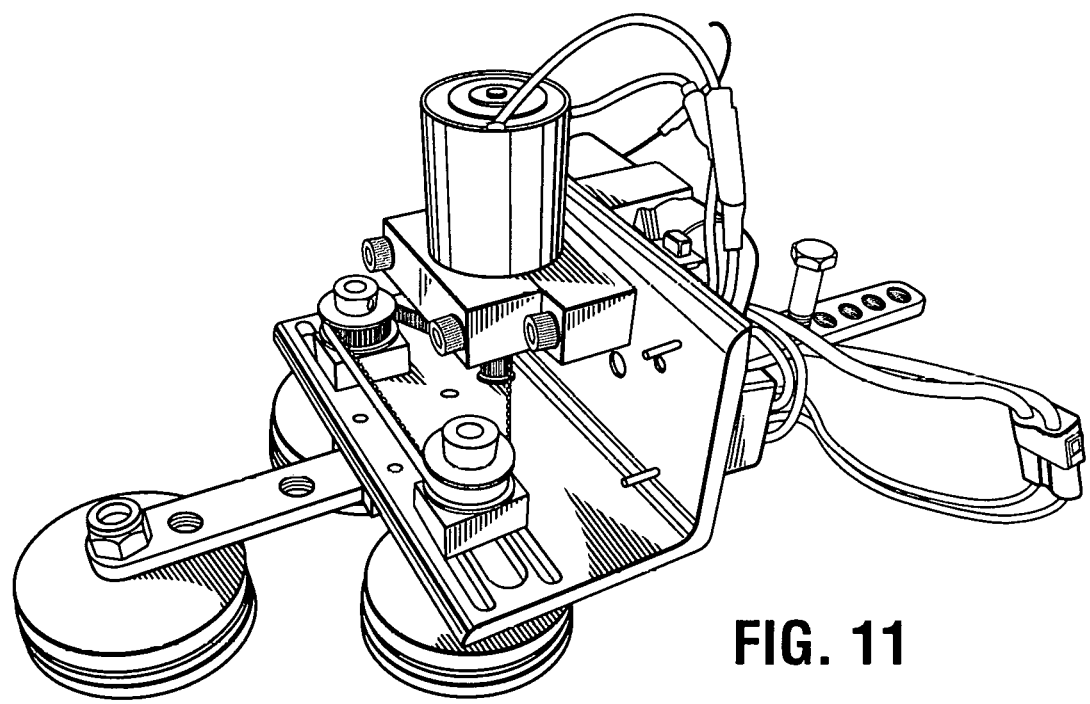
FIG. 11 is a perspective view showing the V-type rollers for holding the trolley body to inner and outer edges of a top flange of an I-beam type rail with the spring tension means.
Figure 12:
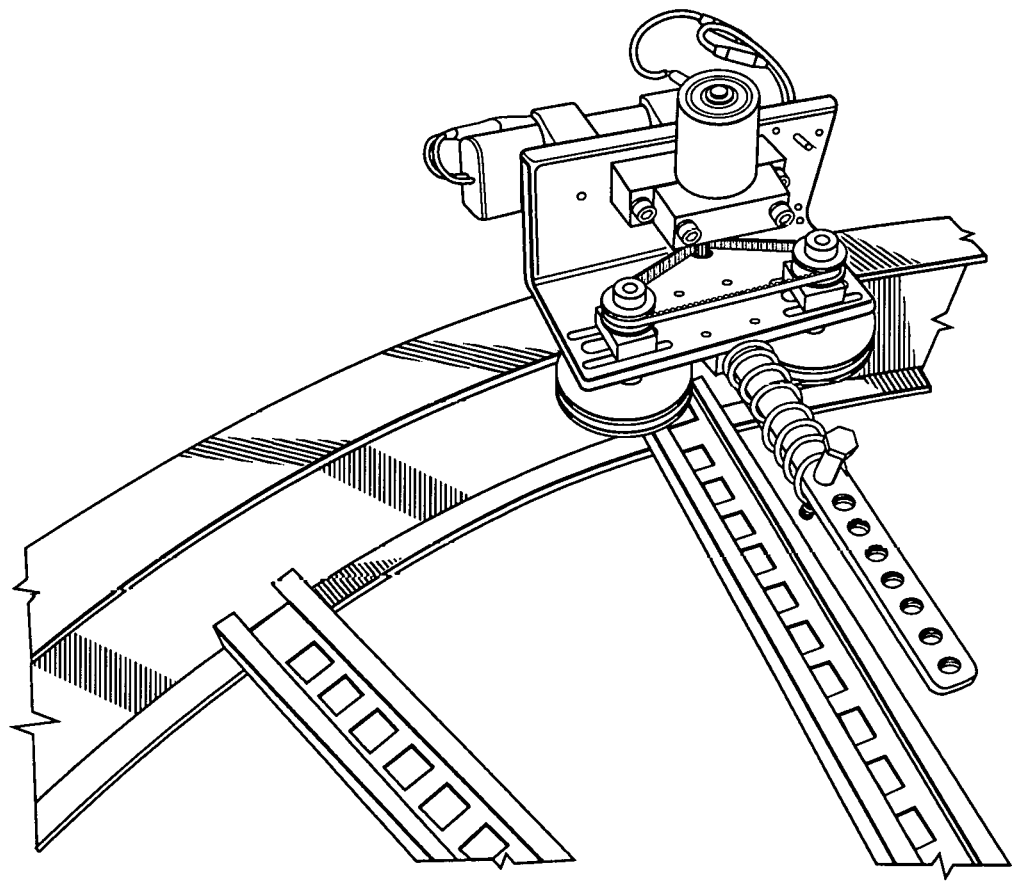
FIG. 12 is a perspective top view of the trolley body mounted to a cable tray rail showing the tension spring means and top rollers spaced apart and disposed on each side of the tension means mounted on the curved conduit flange showing the roller drive belt engaging the motor.
Figure 13:
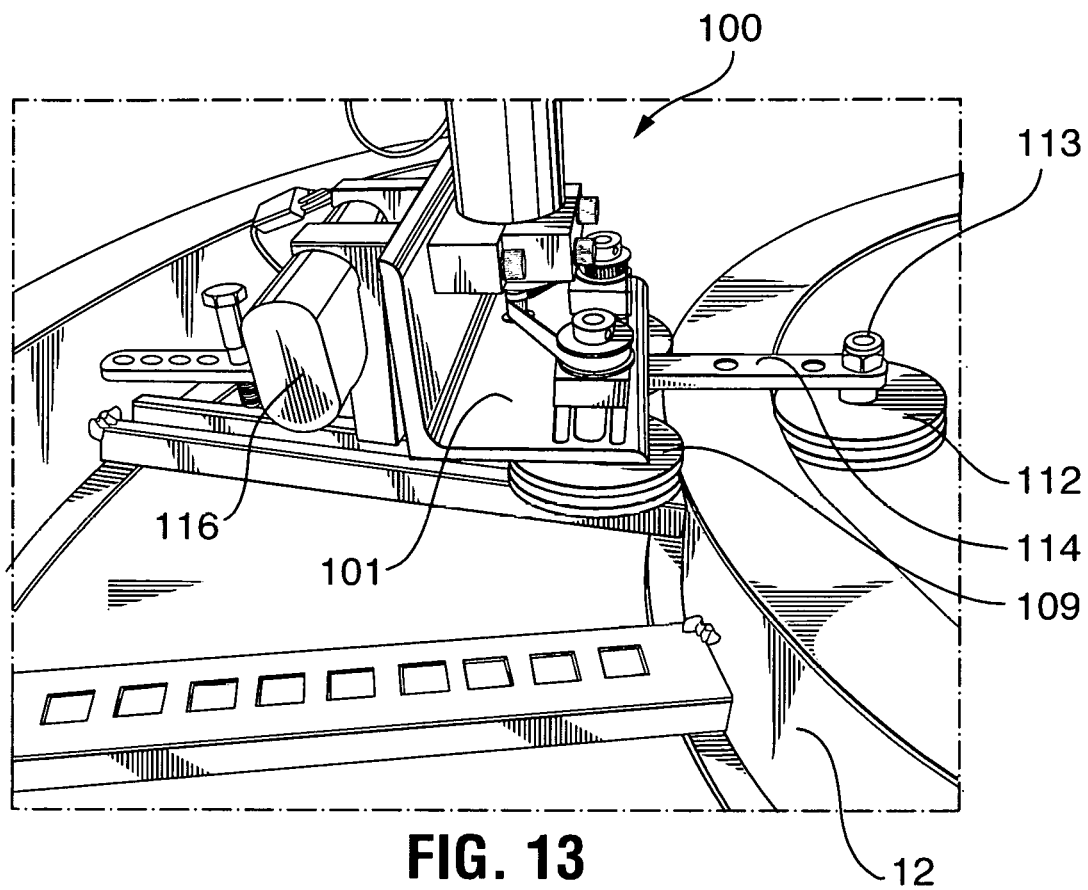
FIG. 13 is an end view showing the trolley body mounted by the rollers onto a cable tray rail with the body disposed between the rails.
Figure 14:
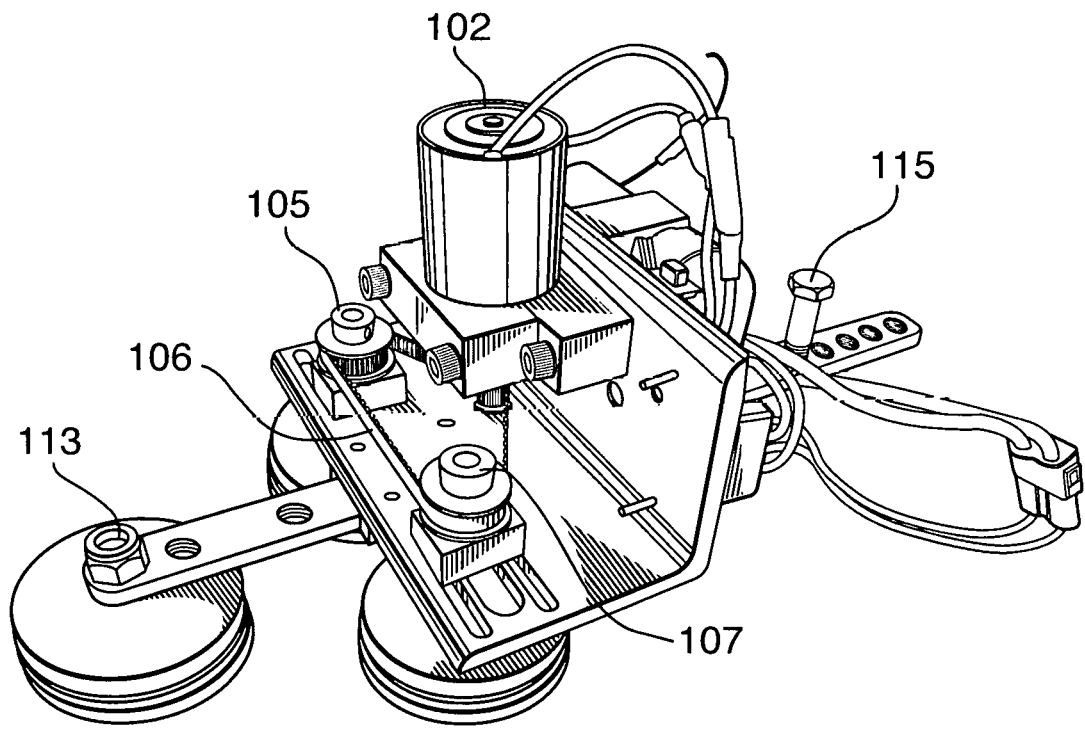
FIG. 14 is a perspective side view of the trolley body showing the motor mounted to the frame in cooperative engagement with a drive spindle having a timing belt extending therefrom driving the drive rollers mounted to the frame below the guide roller or wheel which holds the frame on the rail at a selected pressure depending upon the setting of the adjustable linkage and spring mechanism.
Figure 15:
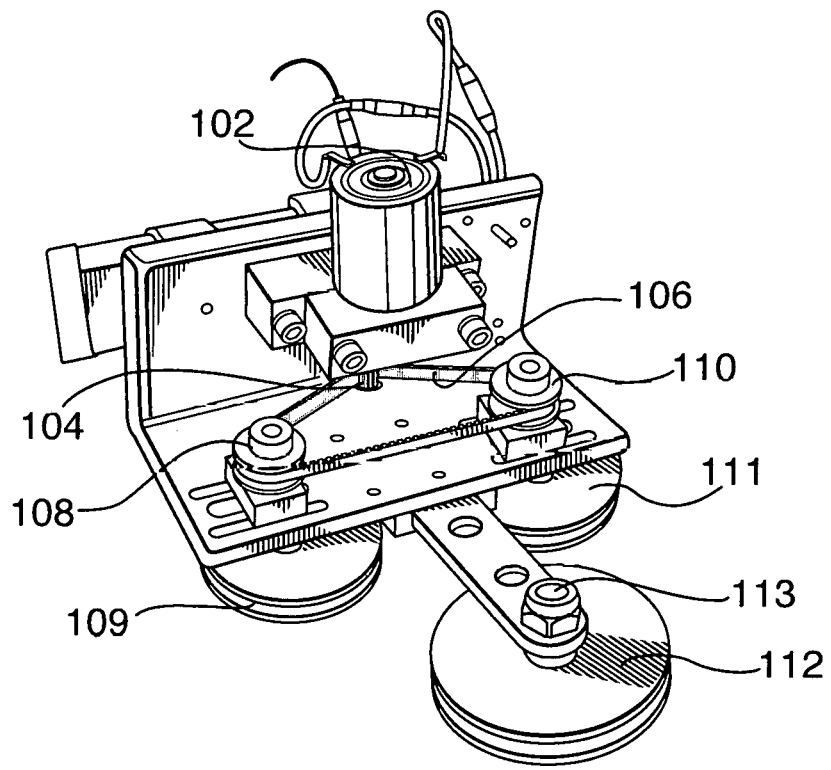
FIG. 15 is an enlarged top perspective view of the belt and drive motor and V-type rollers holding the trolley body.
Figure 16:
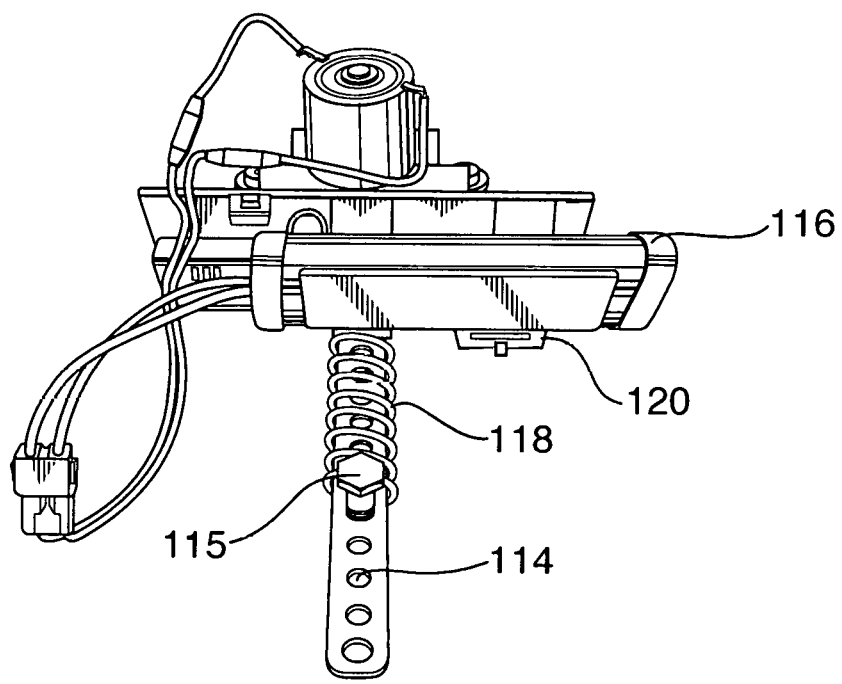
FIG. 16 is an perspective view of the trolley with the drive wheels removed to show the spring adjusted tension mechanism.
Figure 17:
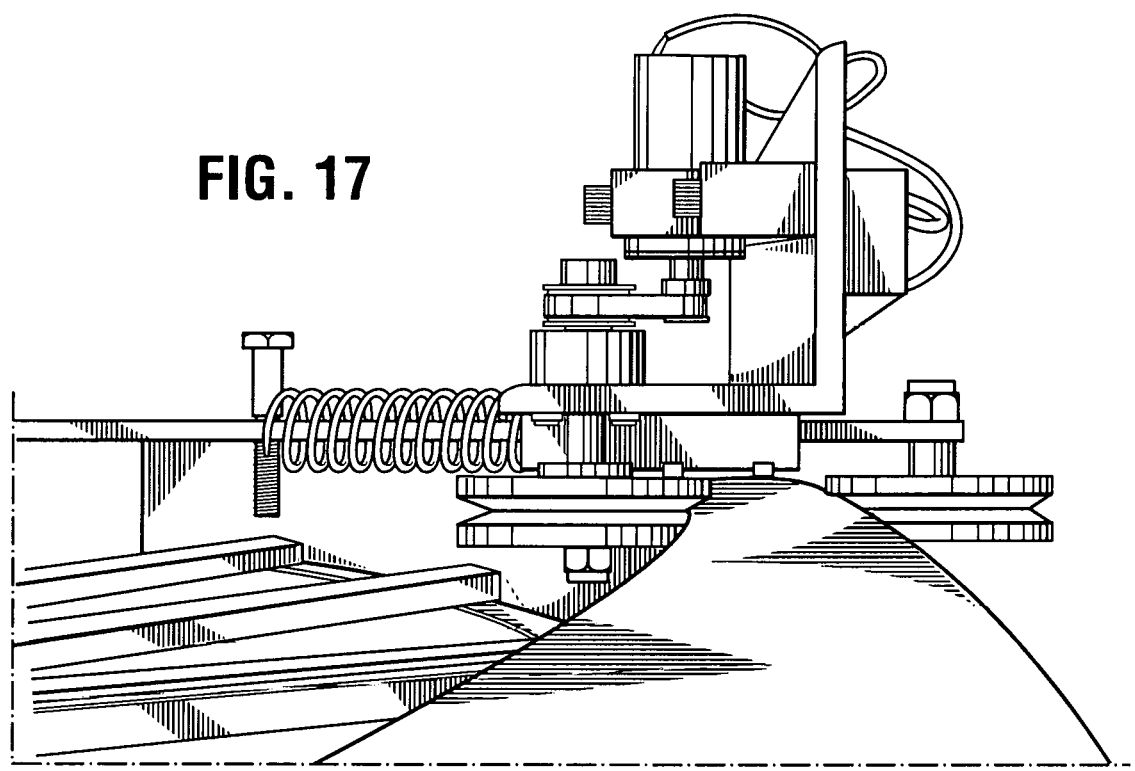
FIG. 17 is an end view showing the trolley body mounted onto a rail of a cable tray showing the guide wheel and drive roller, frame and motor assembly.
Figure 18:
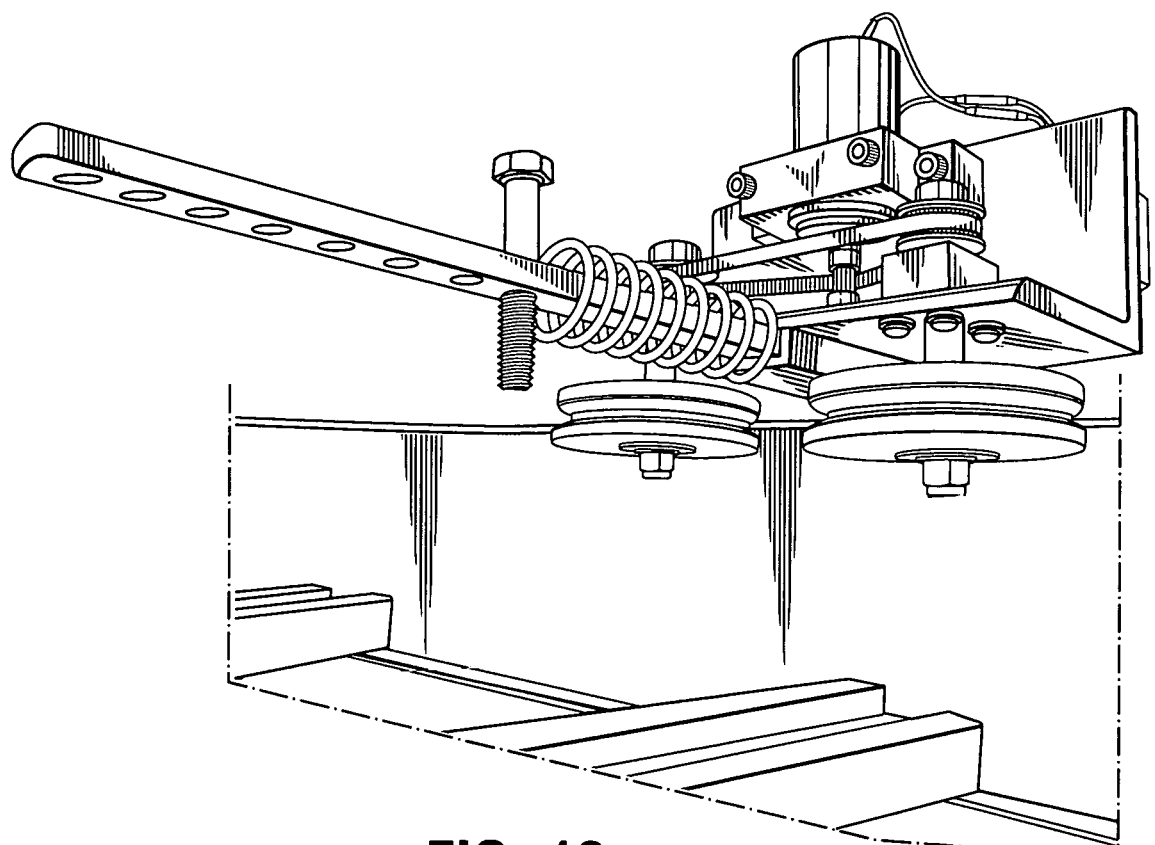
FIG. 18 is a perspective view showing the trolley body mounted onto a rail of a cable tray showing the dual drive rollers, frame and motor assembly.
Figure 19:
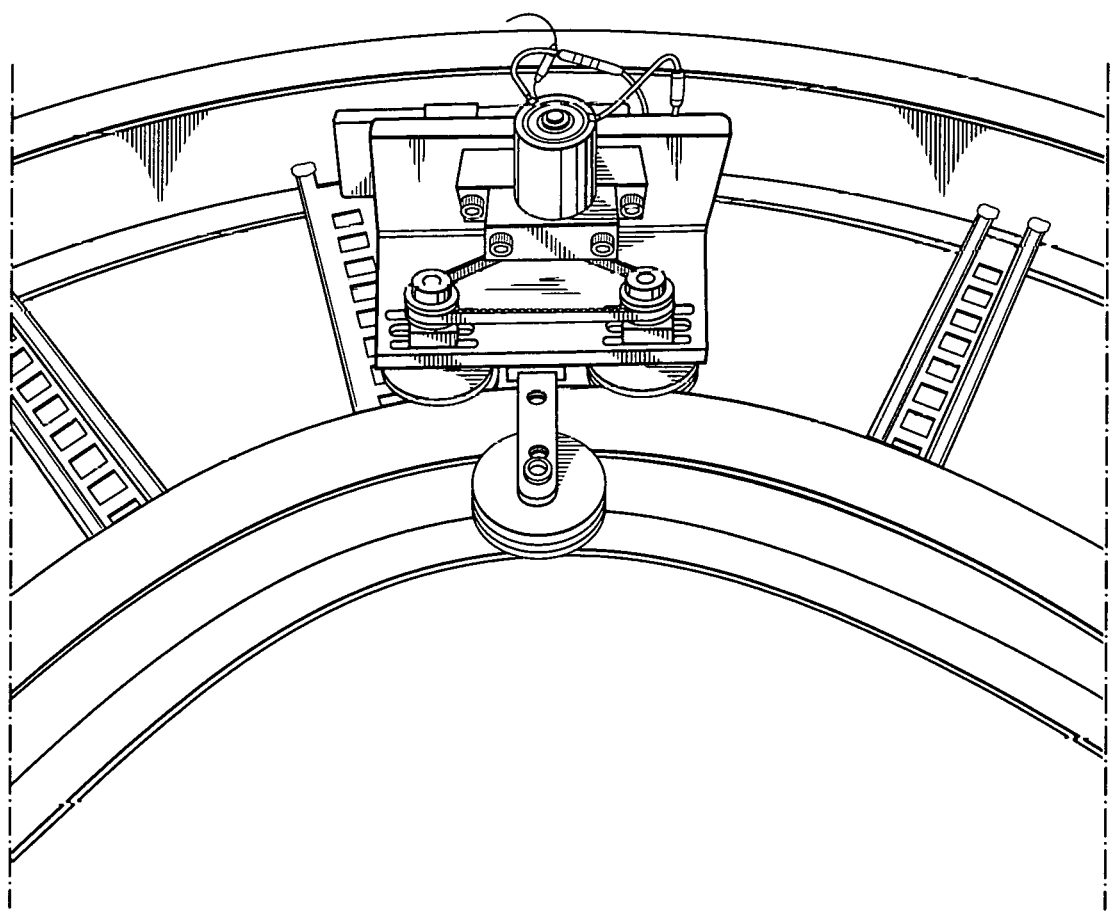
FIG. 19 is a perspective view showing the trolley body mounted on a rail of a cable tray with the body disposed between the curved rails of a ladder type tray.

Another preferred embodiment of the present invention includes an L-shaped frame 101 on which are mounted two axles 105 and 107 fitted with two V-pulleys 109 and 111. The V-pulleys engage the inner edge of the top flange 34 on an I-beam portion of a ladder tray. The outer edge of the top flange is engaged by a non-driven third V-pulley whose axle 113 is mounted on one end of a sliding longitudinal bar 114 (seen in FIGS. 9 and 19) which slides within a channel 122 fixed on the bottom of the L-shaped bracket. The axles are all parallel to one another and the V-notches of the V-pulleys are coplanar with one another. The other end of the bar 114 has multiple apertures for tying a jet line to be dragged down the cable tray. The channel 122 slidably holds the middle portion of the bar 114 with the V-pulley 112 at one end and the multiple apertures at the other end. A spring 118 encircles the bar 114 and is captured between the channel 122 and a pin 115. Thus, the bar 114 is urged by the spring and the V-pulley 112 toward the other two V-pulleys 109 and 111, causing the V-pulleys to grip the top flange 34 as the trolley 100 moves along.

The axles 105 and 107 and the V-pulleys are driven by a belt 106 which is in turn driven by a motor 102. The motor is driven by a remotely controlled motor drive board 120 which is powered by a battery 116. All of the V-pulleys are elastomeric material to provide friction between the flanges and the pulleys.

To connect the trolley to the cable tray, a user aligns the V-notches of the pulleys onto the top flange of the cable tray, fastens one end of a jet line to a selected aperture on the bar 114 and then has only to operate a remote control unit to cause the trolley to pull the jet line through the cable tray to a desired position.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

We claim:

1. A cable pulling apparatus for cable trays, comprising an L-shaped frame on which are mounted a first axle fitted with a first elastomeric V-pulley and a second axle fitted with a second elastomeric V-pulley, said first and second V-pulleys configured to engage an inner edge of a top flange on an I-beam portion of a ladder tray, a non-driven third elastomeric V-pulley configured to engage an outer edge of said top flange, wherein the non-driven third elastomeric V-pulley is rotatably mounted on a third axle mounted on a first end of a sliding longitudinal bar which slides within a channel, said channel fixed on a bottom of said L-shaped frame, all of said axles parallel to one another and V-notches of said V-pulleys coplanar with one another, a second end of said bar having multiple apertures formed therein for tying at least one line to be dragged down said cable tray, said channel slidably holding a middle portion of said bar, a coil spring encircles said bar and is captured between said channel and a pin disposed in one of said apertures, thus, said third V-pulley is urged toward said first and second V-pulleys causing said first, second, and third V-pulleys to grip said top flange as said apparatus moves along said cable tray, said first and second axles and said first and second V-pulleys driven by a belt which is in turn driven by a motor, said motor is driven by a remotely controlled motor drive board which is powered by a battery.

2. The cable pulling apparatus of claim 1, wherein said at least one line is selected from the group consisting of at least one jet line, at least one cable, and combinations thereof.

3. The cable pulling apparatus of claim 1, including a first jet line and a second jet line, wherein said first jet line comprises a jet line leading to a first end of said cable tray and a said second jet line leading to an opposing second end of said cable tray for moving said apparatus manually by pulling said first jet line or said second jet line.

4. The cable pulling apparatus of claim 1, further comprising a swivel grip for removably attaching a cable thereto.

5. The cable pulling apparatus of claim 1, wherein said sliding longitudinal bar and coil spring comprises an adjustable linkage and spring mechanism.

6. The cable pulling apparatus of claim 1, further comprising at least one camera having a transmitter in electrical communication with a computerized smart device selected from the group consisting of a phone, tablet, computer, and video device for controlling said cable pulling apparatus.

7. The cable pulling apparatus of claim 1 including means for preprogramming said cable pulling apparatus.

8. The cable pulling apparatus of claim 1 including means for determining distance comprising a wheel revolution counter, a GPS device, and a marked jet line for to determine the location of within the conduit at any given time.

9. A cable pulling apparatus for cable trays, comprising a frame on which are mounted at least a first axle fitted with a first roller and at least a second axle fitted with a second roller, said first and second rollers configured to engage an inner edge of a flange of a ladder tray, at least one non-driven third roller configured to engage an outer edge of said flange, wherein said non-driven third roller is rotatably mounted on a third axle mounted on a first end of a sliding longitudinal bar which slides within a channel, said channel fixed on a bottom of said frame, all of said axles parallel to one another and said rollers coplanar with one another, a second end of said bar having at least one apertures formed therein for tying at least one line thereto to be dragged down said cable tray, said channel slidably holding a middle portion of said bar, means for adjusting tension of said bar and exerting pressure on said at least one non-driven third roller for urging said at least one non-driven third roller toward said first roller and said second roller causing said first, second, and third rollers to grip said flange as said apparatus moves along said cable tray, said first and second axles and said first and second rollers driven by a motor powered by a battery.

10. The cable pulling apparatus of claim 9, wherein said means for adjusting tension of said bar and exerting pressure on said at least one non-driven third roller comprises said channel slidably holding a middle portion of said bar and a coil spring encircles said bar and is captured between said channel and a pin disposed in one of said at least one aperture.

11. The cable pulling apparatus of claim 9, wherein said at least one line is selected from the group consisting of at least one jet line, at least one cable, and combinations thereof 12. The cable pulling apparatus of claim 9, including a first jet line and a second jet line, said said first jet line leading to a first end of said cable tray and said second jet line leading to an opposing second end of said cable tray for moving said apparatus manually by pulling said first jet line or said second jet line.

13. The cable pulling apparatus of claim 9, wherein said roller comprises an elastomeric V-pulley, a rubber wheel, a rubber roller, a wheel including a friction enhancing surface comprising a rubber or elastomeric surface or coating, a roller including a friction enhancing surface comprising a rubber or elastomeric surface or coating.

14. The cable pulling apparatus of claim 13, wherein said roller includes a central groove extending along the outer periphery thereof.

15. The cable pulling apparatus of claim 9, wherein said flange extends from a cable ladder tray, a cable rail, a cable conduit, a slotted conduit cable tray, an I-beam, a rail, and combinations thereof 16. The cable pulling apparatus of claim 9, wherein a sliding longitudinal bar and a coil spring comprises an adjustable linkage and a spring mechanism.

17. The cable pulling apparatus of claim 9, further comprising at least one camera having a transmitter in electrical communication with a computerized smart device selected from the group consisting of a phone, tablet, computer, and video device for controlling said cable pulling apparatus.

18. The cable pulling apparatus of claim 9 including means for preprogramming said cable pulling apparatus.

19. The cable pulling apparatus of claim 9 including means for determining distance comprising a wheel revolution counter, a GPS device, and a marked jet line for to determine the location of within the conduit at any given time.

20. The cable pulling apparatus of claim 9, wherein said means for adjusting tension of said bar and exerting pressure on said at least one non-driven third roller comprises a coil spring encircling a slide bar.

* * * * *